US012723679B2

(12) United States Patent
Zhang

(10) Patent No.: US 12,723,679 B2
(45) Date of Patent: Sep. 1, 2026

(54) SWIVEL SPACER

(71) Applicant: Panduit Communication Components (Wuxi) Co., Ltd., Wuxi (CN)

(72) Inventor: Shigui Zhang, Wuxi (CN)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/851,805

(22) PCT Filed: May 24, 2023

(86) PCT No.: PCT/CN2023/095968
§ 371 (c)(1),
(2) Date: Sep. 27, 2024

(87) PCT Pub. No.: WO2023/227013
PCT Pub. Date: Nov. 30, 2023

(65) Prior Publication Data

US 2025/0207692 A1 Jun. 26, 2025

(30) Foreign Application Priority Data

May 25, 2022 (CN) ........................ 202221278665.5

(51) Int. Cl.
*F16L 3/237* (2006.01)
*F16L 3/08* (2006.01)
*F16L 3/137* (2006.01)

(52) U.S. Cl.
CPC ............... *F16L 3/137* (2013.01); *F16L 3/085* (2013.01); *F16L 3/237* (2013.01)

(58) Field of Classification Search
CPC . F16L 3/137; F16L 3/085; F16L 3/237; F16L 3/1223; F16B 5/06
See application file for complete search history.

(56) References Cited

U.S. PATENT DOCUMENTS 3,023,989 A 3/1962 White
3,250,505 A * 5/1966 Rodman, Sr. ........... F16L 3/233 248/74.3

(Continued)

FOREIGN PATENT DOCUMENTS

CN 204114357 U 1/2015
EP 0613225 A1 8/1994

(Continued)

OTHER PUBLICATIONS

Hellermann Tyton's Dual Swivel Saddle Spacer spec sheet, 3 pgs., 2022.

(Continued)

*Primary Examiner* — Nkeisha Smith
(74) *Attorney, Agent, or Firm* — Freda Li; Christopher S. Clancy; James H. Williams

(57) ABSTRACT

A swivel spacer comprises a first component and a second component rotatably connected with respect to each other. Wherein, the first component comprises thereon two first central anchors with a first central contact surface formed therebetween, a first left anchor provided on the left side of the first component with a first left contact surface formed between one of the first central anchors on the left side and the first left anchor, and a first right anchor provided on the right side of the first component with a first right contact surface formed between one of the first central anchors on the right side and the first right anchor. The second component can include a structure similar to that of the first component, the swivel spacer with such structure can be adapted to elongated members, such as wires, wire bundles, tubes and the like, with various sizes.

8 Claims, 6 Drawing Sheets

(56) References Cited

U.S. PATENT DOCUMENTS

| | | | | | |
|---|---|---|---|---|---|
| 3,486,725 | A * | 12/1969 | Hidassy | F16L 3/237 174/40 R |
| 4,562,982 | A * | 1/1986 | McSherry | H02G 7/06 248/68.1 |
| 5,538,208 | A * | 7/1996 | Cordes | F16L 3/233 248/69 |
| 5,730,399 | A * | 3/1998 | Baginski | H02G 3/263 248/68.1 |
| D399,414 | S * | 10/1998 | Viklund | H02G 3/32 D8/356 |
| 5,954,302 | A * | 9/1999 | Robertson | H02G 3/26 248/74.3 |
| 6,129,317 | A * | 10/2000 | Rodrigues | F16L 3/137 248/74.3 |
| 6,196,751 | B1 * | 3/2001 | Khokhar | B60R 16/0215 24/17 AP |
| 6,364,257 | B1 * | 4/2002 | Holder | F16L 3/237 248/74.1 |
| 6,533,226 | B2 * | 3/2003 | Geiger | F16L 3/237 248/68.1 |
| D543,835 | S * | 6/2007 | Geiger | D8/354 |
| 7,600,724 | B2 | 10/2009 | Nelson et al. | |
| 7,861,981 | B2 * | 1/2011 | Olver | H02G 3/32 248/65 |
| 7,913,957 | B2 | 3/2011 | Nelson et al. | |
| 8,829,353 | B2 * | 9/2014 | Homner | H02G 3/32 248/65 |
| 9,067,717 | B2 * | 6/2015 | DeMik | F16L 3/221 |
| D734,654 | S | 7/2015 | Geiger | |
| D760,067 | S | 6/2016 | Geiger | |
| 10,096,934 | B1 * | 10/2018 | Desjardins | H01R 13/5841 |
| 10,663,089 | B2 * | 5/2020 | Sylvester | F16L 3/137 |
| 2002/0071715 | A1 * | 6/2002 | Geiger | H02G 11/00 403/119 |
| 2007/0290100 | A1 | 12/2007 | Caveney | |
| 2010/0096511 | A1 * | 4/2010 | Olver | H02G 3/32 248/65 |
| 2011/0114802 | A1 * | 5/2011 | Hjerpe | F16L 3/26 248/68.1 |
| 2011/0303799 | A1 * | 12/2011 | Blanchard | H02G 3/32 248/65 |
| 2013/0068899 | A1 * | 3/2013 | Richter | F16L 3/02 248/65 |
| 2013/0175410 | A1 | 7/2013 | Caveney | |
| 2024/0360856 | A1 * | 10/2024 | Klos | F16B 2/08 |

FOREIGN PATENT DOCUMENTS

| | | | |
|---|---|---|---|
| EP | 1620670 | B1 | 12/2008 |
| EP | 3480910 | A1 | 5/2019 |
| WO | 2003050444 | A1 | 6/2003 |

OTHER PUBLICATIONS

Hellermann Tyton's Dual Swivel Saddle drawing, 1 pg., Jun. 2, 1999.

Panduit's Heavy Duty Cable Tie Mount drawings, 2 pgs., Apr. 16, 2019.

Panduit's Swivel Tie Mount drawing, 1 pg., Nov. 1, 2000.

* cited by examiner

SWIVEL SPACER

TECHNICAL FIELD

The present disclosure relates to the field of wiring and/or tubing apparatus, and more particularly to a swivel spacer for supporting and securing elongated members.

BACKGROUND

In the technical field of electrical wiring arrangement, tubing arrangement, etc., swivel spacers are often used to secure more than two elongated members such as wire/cable bundles, tubes and the like, and can separate the elongated members from each other to prevent them from interference, including physical interference, electrical interference, etc, with each other. Here, the so-called interference is, for example, friction between two elongated members, mutual abrasion, mutual contact resulting in a short circuit, and the like. Also, the swivel spacer enables a plurality of different angles between the elongated members secured thereto.

An existing swivel spacer for elongated members such as cables and tubes comprises an anchoring structure and contact surfaces. Securing members such as cable ties can be connected to the anchoring structure and tie the elongated structures tightly so as to secure elongated structures on the swivel spacer, and the elongated structures are in contact with the contact surfaces on the swivel spacer. Also, portions of the swivel spacer for securing the different elongated members can be rotated relative to each other so that the elongated members secured on the swivel spacer are crossed each other at a desired angle.

For the existing swivel spacer, it is found that there are still some problems in use. For example, in order to solidly secure the elongated members to the swivel spacer, it is required to secure the elongated members tightly with cable ties, which will compress the elongated member especially when the secured elongated members are members such as hoses that are relatively easy to be compressed, and this will cause the elongated members to deform, for example, to be compressed and deformed under the joint action of the cable ties and the contact surfaces.

In addition, a specific swivel spacer is usually only applicable to elongated members of a specific size or size ranges. Thus, a plurality of swivel spacers are required when the elongated members such as cables and tubes to be secured involve a variety of different sizes.

Therefore, there is a need for further improvement based on the existing swivel spacer to overcome the above-mentioned problems existing in the prior art.

SUMMARY

The solutions in the present disclosure is made to solve the above-mentioned technical problems in the prior art. The purpose of this disclosure is to provide a swivel spacer with an improved structure, where the swivel spacer is a saddle type, which may be adapted to secure elongated members of a variety of different sizes. In addition, the swivel spacer may avoid or reduce compressional deformation of the elongated members. Further, the swivel spacer of the present disclosure may realize relative rotation between different parts thereof with a simple structure.

The swivel spacer of the present disclosure comprises a first component and a second component that are rotatably connected with respect to each other. Wherein, the first component comprises thereon two first central anchors with a first central contact surface formed therebetween, a first left anchor provided on the left side of the first component with a first left contact surface formed between one of the first central anchors on the left side and the first left anchor, and a first right anchor provided on the right side of the first component with a first right contact surface formed between one of the first central anchors on the right side and the first right anchor.

Similar to the first component, the second component comprises thereon two second central anchors with a second central contact surface formed therebetween, a second left anchor provided on the left side of the second component with a second left contact surface formed between one of the second central anchors on the left side and the second left anchor, and a second right anchor provided on the right side of the second component with a second right contact surface formed between one of the second central anchors on the right side and the second right anchor.

With the above structure, the swivel spacer of the present disclosure comprises a plurality of contact surfaces, and the shapes and sizes of these contact surfaces can be different, so that the swivel spacer may be adapted to secure elongated members of a variety of different sizes (e.g., cross-sectional diameters).

Preferably, at least one of the first central contact surface, the first left contact surface, the first right contact surface, the second central contact surface, the second left contact surface and the second right contact surface is in the form of a curved concave surface. The contact surface in the form of a curved concave surface may at least partially mate with the outer peripheral surface of the elongated member with a generally circular cross-section, thereby helping to reduce the compressional deformation of a elongated member when the elongated member is secured to the swivel spacer.

In particular, the first central contact surface and the second central contact surface may be configured with relatively large dimensions so as to be able to carry elongated members having a cross-sectional diameter of, for example, 1.25 inches or less.

In addition, the first left contact surface, the first right contact surface, the second left contact surface and the second right contact surface may be configured with smaller dimensions so as to be able to carry elongated members having a cross-sectional diameter of, for example, 0.7 inches or less.

Preferably, a cylindrical cavity is formed in one of the first component and the second component, and several curved tabs are formed on the other one of the first component and the second component, the curved tabs may be inserted into the cylindrical cavity to achieve the connection between the first component and the second component. An interference fit may be formed between the cylindrical cavity and the curved tab such that the curved tabs cannot be easily withdrawn from the cylindrical cavity after the curved tabs are inserted into the cylindrical cavity, but are allowed to rotate relative to the cylindrical cavity, thereby realizing relative rotation between the first component and the second component. As a result, a relatively rotatable connection between the first component and the second component can be realized with a simple structure.

In a particular structure, a stopper is formed on the free end of each curved tab, at least the portion of at least the stopper of the curved tab having an outer diameter that is larger than an inner diameter of the cylindrical cavity such that the curved tab can be prevented from being withdrawn from the cylindrical cavity by the stopper after inserting the curved tab into the cylindrical cavity.

For example, the stopper is an outwardly protruding flange at the free end of the curved tab. After the curved tab is inserted into the cylindrical cavity, the stopper will protrude from the cylindrical cavity to prevent withdraw of the curved tab from the cylindrical cavity in an opposite direction.

Or, in another structure, the stopper can be eliminated, and the overall outer diameter of the curved tab is slightly larger than the inner diameter of the cylindrical cavity, so that an interference fit is formed between the curved tab and the cylindrical cavity when the curved tab is inserted into the cylindrical cavity.

Here, examples of the elongated members capable of being secured on the swivel spacer include at least one of cables, cable bundles, and ducts.

BRIEF DESCRIPTION OF THE DRAWINGS

The detailed description of the disclosure can be more clearly understood from the structure shown in the accompanying drawings, in which.

REFERENCE LIST

Figure 1:
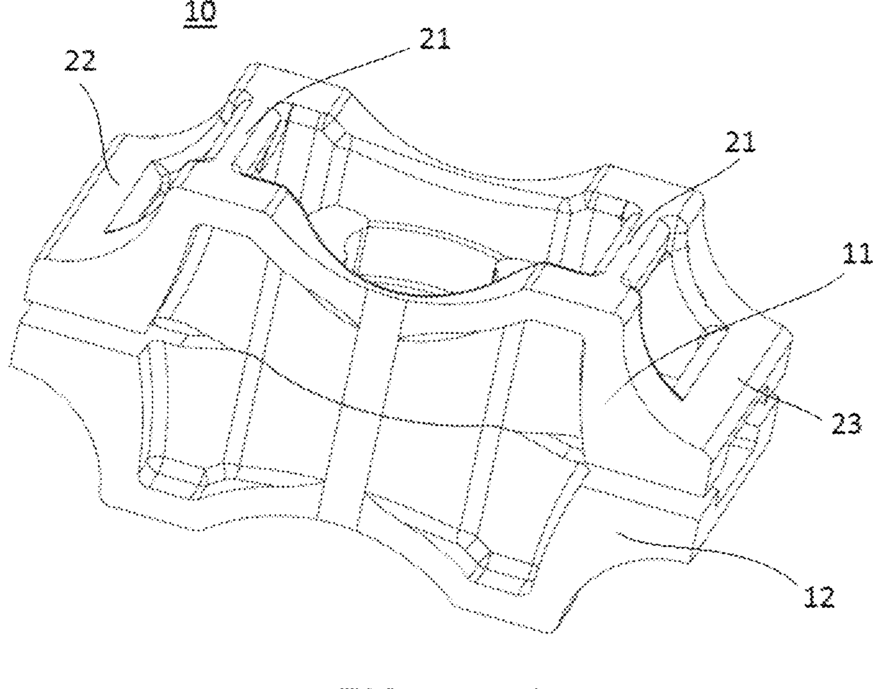
FIG. 1 illustrates a top perspective view of the swivel spacer of the disclosure, from which the structure of the first component of the swivel spacer can be seen more clearly.

10 Swivel spacer
11 First component
12 Second component
13 Cylindrical cavity
14 Curved tab
15 Stopper
21 First central anchor
22 First left anchor
23 First right anchor
31 Second central anchor
32 Second left anchor
33 Second right anchor
41 First central contact surface
42 First left contact surface
43 First right contact surface
44 Second central contact surface
45 Second left contact surface
46 Second right contact surface
50 Cable tie
61 First cable bundle
62 Second cable bundle

DETAILED DESCRIPTION

To facilitate the understanding of the present disclosure, the detailed description of the disclosure will be provided below with reference to the accompanying drawings. It should be understood that what is shown in the accompanying drawings are only preferred embodiments of the disclosure, which should not be understood as limiting the scope of the disclosure. Those skilled in the art may make various obvious modifications, variations, equivalent replacements of the disclosure based on the embodiments shown in the accompanying drawings, and the technical features in the different embodiments described below may be arbitrarily combined with each other without contradiction, and they all fall within the scope of the disclosure.

In the following specific description of the present disclosure, the terms such as "up", "down", "left", and "right" used to express direction and orientation are based on the structure shown in the accompanying drawings during use. It should be understood that the orientation of the structure may also be changed according to particular applications.

Figure 2:
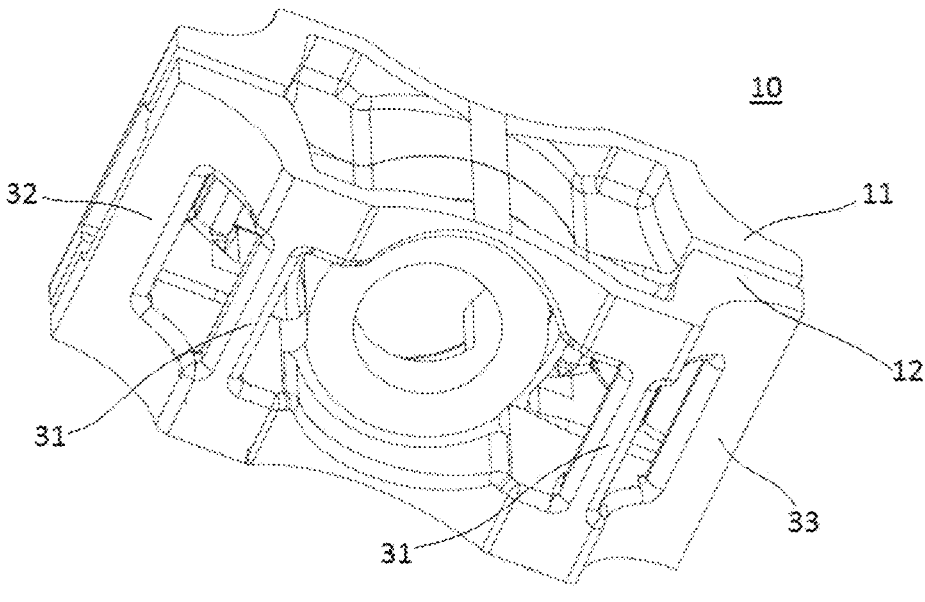
FIG. 2 illustrates a bottom perspective view of the swivel spacer of FIG. 1, from which the structure of the second component of the swivel spacer can be seen more clearly.
Figure 3:
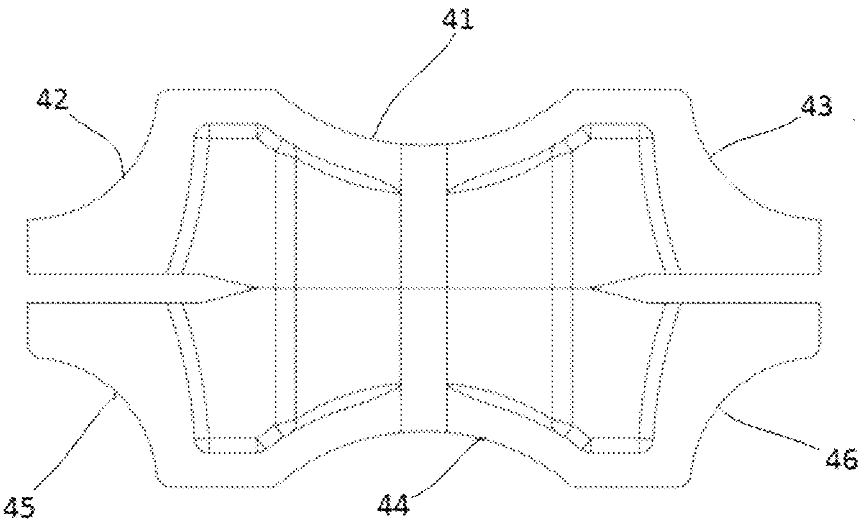
FIG. 3 illustrates a side view of the swivel spacer of FIG. 1.

FIG. 1 illustrates a top perspective view of a swivel spacer 10 of the present disclosure, in which the structure of the first component 11 of the swivel spacer 10 is more clearly shown, and FIG. 2 illustrates a bottom perspective view of the swivel spacer 10, in which the structure of the second component 12 of the swivel spacer 10 is more clearly shown. FIG. 3 illustrates a side view of the swivel spacer 10.

As shown, the swivel spacer 10 is composed of a first component 11 and a second component 12 among others, and the first component 11 and the second component 12 shown in FIG. 1 are substantially mirror images of each other in appearance. The following will mainly take the first component 11 as an example to describe its general structure.

Two first central anchors 21 are provided on the first component 11, in particular at its top, and a first central contact surface 41 is defined between the first central anchors 21 (FIG. 3). The first central contact surface 41 is preferably in the shape of an curved concave surface. As shown, an exemplary structure of the first central anchors 21 is a suspended beam under which a securing member, such as a cable tie 50 mentioned hereinafter, may pass and form a ring shape, the ring shape is able to tie the cables/cable bundles and the beam together, thereby securing the cables/cable bundles on the swivel spacer 10.

A first left anchor 22 and a first right anchor 23 are respectively provided on both sides of the first component 11. A first left contact surface 42 is formed between the first left anchor 22 and the first central anchor 21 on the left side, which is also preferably in the shape of a curved concave surface. A first right contact surface 43 is formed between the first right anchor 23 and the first central anchor 21 on the right side, which is also preferably in the shape of a curved concave surface.

The first left anchor 22 and the first right anchor 23 may also be in the form of beams, and a cable tie 50 may pass under the first left anchor 22 and the first right anchor 23 in the form of a beams, and forms a ring shape.

A cable/cable bundle secured on the swivel spacer 10 is usually cylindrical or at least partially comprises a curved outer surface, so that the shape of the above-mentioned curved concave surface of each contact surface may at least partially fit the outer surface of the elongated member being secured, which helps to reduce compression on the elongated member.

As shown in FIG. 2, similar to the first component 11, the second component 12 is provided with two second central anchors 31, and a second left anchor 32 and a second right anchor 33 respectively located on both sides of the second component 12. A second central contact surface 44 is formed between the two second central anchors 31, a second left contact surface 45 is formed between the second central anchor 31 on the left side and the second left anchor 32, and a second right contact surface 46 is formed between the second central anchor 31 on the right side and the second right anchor 33.

The second central contact surface 44, the second left contact surface 45 and the second right contact surface 46 are also preferably curved concave surfaces.

The swivel spacer 10 with the above structure may be adapted to cables/cable bundles of a variety of different sizes, for example, it can carry cables/cable bundles having a size (e.g., cross-sectional diameter) of at least 0.5 inches (in.). Further, the swivel spacer 10 with the above structure may be adapted to carry four cables/cable bundles of sizes up to 0.7 inches, and/or two cables/cable bundles of sizes up to 1.25 inches.

Figure 4A:
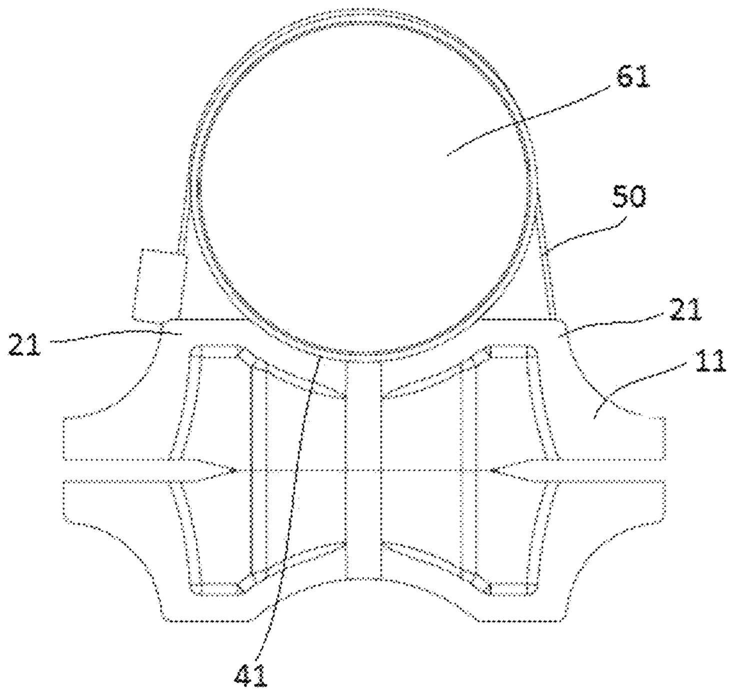
FIGS. 4*a*-4*c* schematically illustrate the securing of a first cable bundle with a larger diameter on central contact surfaces of the swivel spacer, in side, perspective and cross-sectional views.
Figure 4B:
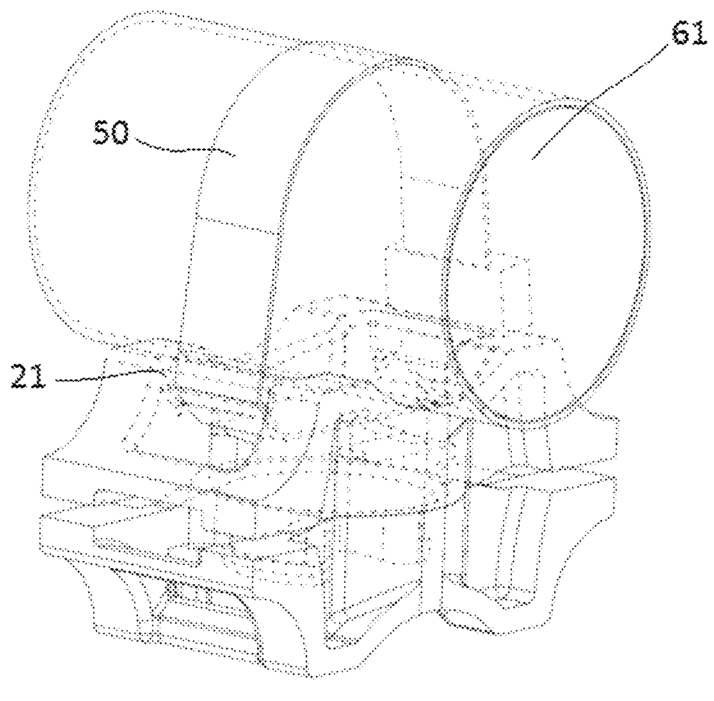
Figure 4C:
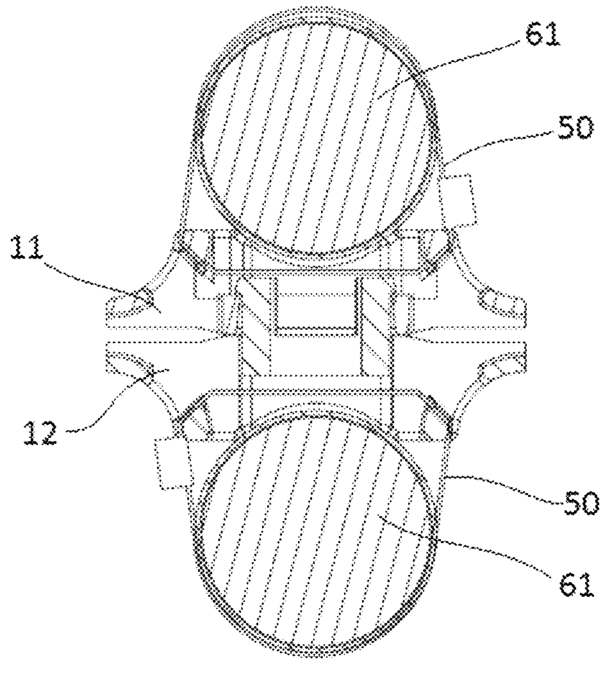

FIGS. 4*a*-4*c* schematically illustrate the securing of a first cable bundle 61 with a larger diameter on the first central contact surface 41 and/or the first left contact surface 42 of the swivel spacer 10. For example, the cross-sectional diameter of the first cable bundle 61 may be 1.25 inches. As shown in FIGS. 4*a* and 4*b*, the cable tie 50 passes through the two first central anchors 21 of the first component 11 to form a cable tie loop to tie the first cable bundle 61 on the first component 11, and the first cable bundle 61 abuts against the first central contact surface 41. And, because the first central contact surface 41 is in the form of a curved concave surface, the outer surface of the first cable bundle 61 at least partially fits the first central contact surface 41, thereby avoiding or reducing the deformation of the first cable bundle 61 caused by the tightening of the tie 50 on the first cable bundle 61.

As shown in FIG. 4*c*, one first cable bundle 61 may also be secured on the second component 12 in abutment against the second central contact surface 44. Further, one first cable bundle 61 may be secured on each of the first component 11 and the second component 12, so that two first cable bundles 61 can be secured on the swivel spacer 10 simultaneously.

Figure 5A:
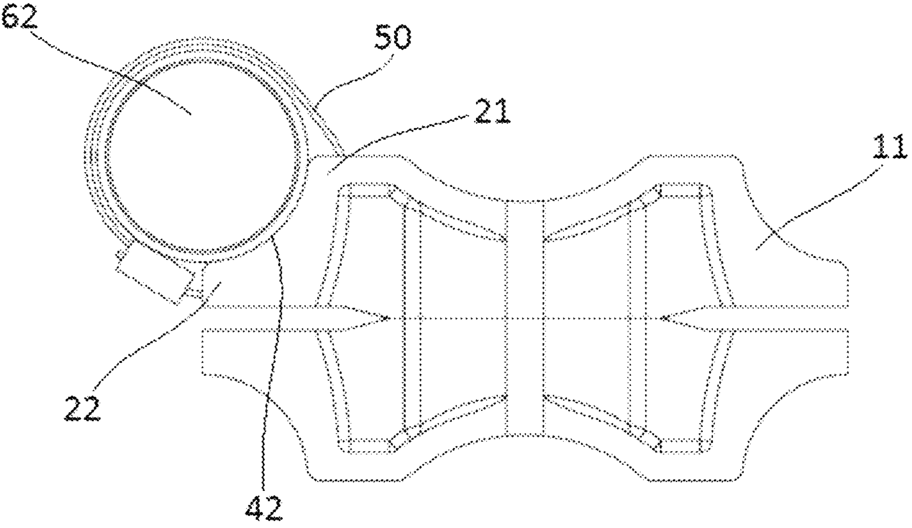
FIGS. 5*a*-5*c* schematically illustrate the securing of a second cable bundle with a smaller diameter on side contact surfaces of the swivel spacer, in side, perspective and cross-sectional views.
Figure 5B:
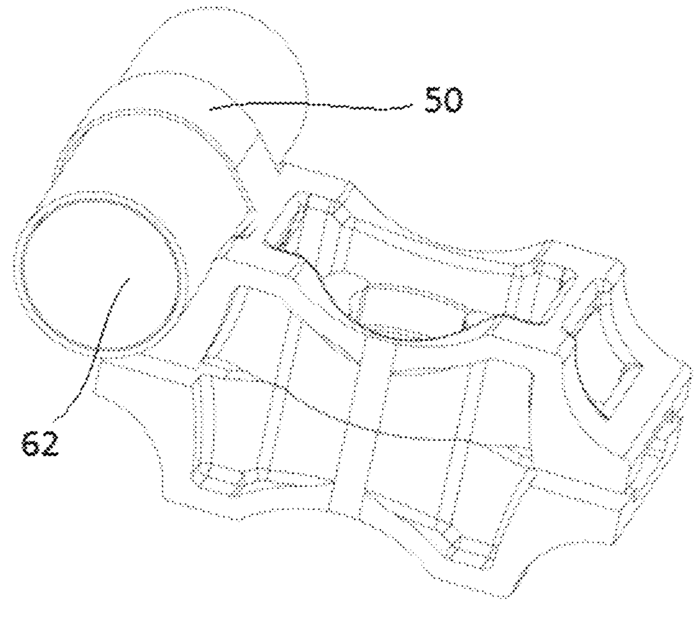
Figure 5C:
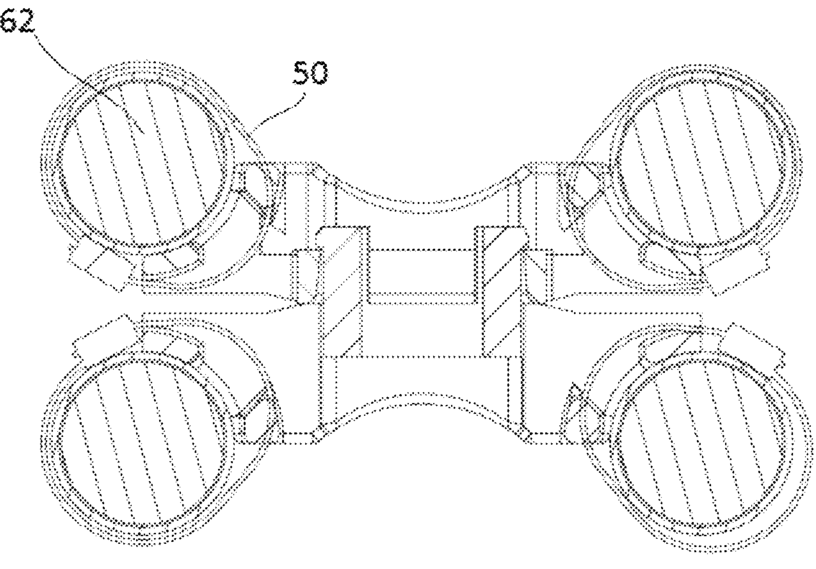

FIGS. 5*a*-5*c* schematically illustrate the securing of a second cable bundle 62 with a smaller diameter (e. g., cross-sectional diameter) by abutting against the first left contact surface 42 and the first right contact surface 43 of the first component 11 and against the first right contact surface 43 and the second central contact surface 44 of the second component 12. As schematically shown, for example, in FIGS. 5*a* and 5*b*, a cable tie 50 may pass through the first central anchor 21 on the left side and the first left anchor 22 on the first component 11 to form a loop, thereby tying the second cable bundle 62 to the first component 11 against the first left contact surface 42.

As shown in FIG. 5*c*, one second cable bundle 62 can be secured on each of the first left contact surface 42, the first right contact surface 43, the second left contact surface 45 and the second right contact surface 46. In other words, the swivel spacer 10 of the present disclosure can simultaneously carry four second cable bundles 62.

The first component 11 and the second component 12 of the swivel spacer 10 can be rotated relative to each other, so that the first cable bundle 61 and/or the second cable bundle 62 secured to the first member 11 and the first cable bundle 61 and/or the second cable bundle 62 secured to the second member 12 are at a desired angle to each other. To this end, a rotation means is provided between the first component 11 and the second component 12. A particular embodiment structure of the rotation means is clearly shown in FIG. 6.

Figure 6:
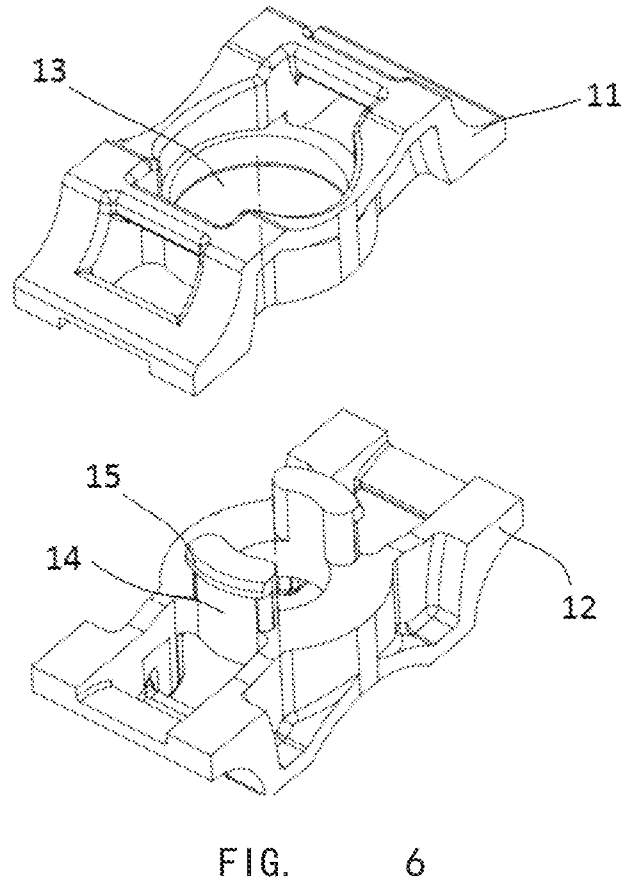
FIG. 6 illustrates an exploded perspective view of the swivel spacer of FIG. 1, from which an exemplary structure of a connecting means for connecting the first component and the second component together can be seen more clearly.

As shown in FIG. 6, a cylindrical cavity 13 is provided in a substantially central portion of the first component 11 and several curved tabs 14 are provided on the second component 12. The curved tabs 14 are in the form of cantilevers derived from the second component 12. A stopper 15 is formed on the free end of each curved tab 14, for example in the form of a flange protruding from the outer surface of the curved tab 14.

Preferably, the curved tab 14 is preferably provided such that an outer surface of the curved tab 14 and an inner surface of the cylindrical cavity 13 can cooperate with each other when the first component 11 and the second component 12 are assembled together.

The curved tab 14 is inserted into the cylindrical cavity 13 when the first component 11 and the second component 12 are assembled together. Wherein, the outer diameter of at least the portion of the stopper 15 of the curved tab 14 is slightly larger than the inner diameter of the cylindrical cavity 13, and during the process of inserting the curved tab 14 into the cylindrical cavity 13, there is an interference fit between at least the stopper 15 and the cylindrical cavity 13, so that the curved tabs 14 are slightly deformed inwardly. After the stopper 15 passes through the cylindrical cavity 13, the curved tab 14 may recover, and the stopper 15 may prevent the curved tab 14 from withdrawing from the cylindrical cavity 13, thereby realizing the connection between the first component 11 and the second component 12. Also, the cooperation between the curved tab 14 and the cylindrical cavity 13 allows relative rotation between the first component 11 and the second component 12.

Figure 7:
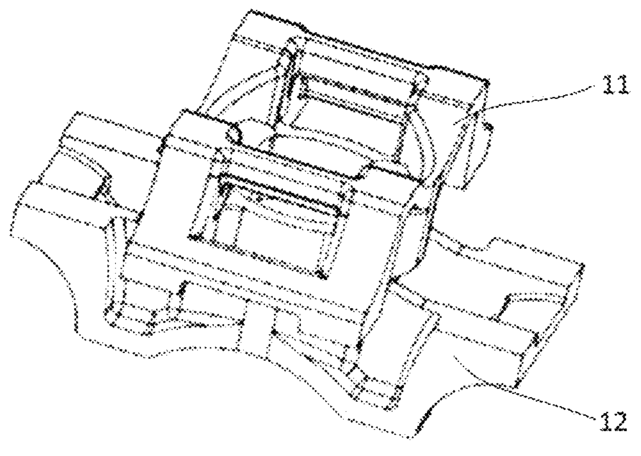
FIG. 7 illustrates a schematic perspective view of the first component and the second component of the swivel spacer of FIG. 1 rotated 90 degrees relative to each other.

As shown in FIG. 7, the first component 11 can be rotated at least 90 degrees relative to the second component 12 such that the elongated member secured to the first component 11 may extend crosswise with the elongated member secured to the second component 12.

It can be understood that the positions for providing the cylindrical cavity 13 and the curved tab 14 can also be interchanged, that is, the curved tab 14 is arranged on the first component 11, and the cylindrical cavity 13 is arranged in the second component 12, which is also within the scope of the present disclosure.

In addition, the above mentioned stopper 15 formed on the free end of the curved tab 14 is optional. The outer surface of the curved tab 14 can be set to generally have an outer diameter that is slightly larger than the inner diameter of the cylindrical cavity 13, such that when the curved tab 14 is inserted into the cylindrical cavity 13, an interference fit is formed between the cylindrical cavity 13 and the curved tab 14 to connect the first component 11 with the second component 12.

In the detailed description disclosed above, a cable/cable bundle are described as an example of the elongated member being secured to the swivel spacer 10. However, as already mentioned, the elongated member that may be held by the swivel spacer 10 may also be a duct (e.g., a hose), etc.

The invention claimed is:

1. A swivel spacer comprising a first component and a second component rotatably connected to each other, wherein the first component comprises;

two first central anchors with a first central contact surface formed therebetween;

a first left anchor provided on a left side of the first component with a first left contact surface formed between one of the two first central anchors and the first left anchor; and a first right anchor provided on a right side of the first component with a first right contact surface formed between one of the two first central anchors and the first right anchor, and the second component comprises;

two second central anchors with a second central contact surface formed therebetween;

a second left anchor provided on a left side of the second component with a second left contact surface formed between one of the two second central anchors and the second left anchor; and a second right anchor provided on a right side of the second component with a second right contact surface formed between one of the two second central anchors and the second right anchor.

2. The swivel spacer of claim 1, wherein at least one of the first central contact surface, the first left contact surface, the first right contact surface, the second central contact surface, the second left contact surface and the second right contact surface is in the form of a curve concave surface.

3. The swivel spacer of claim 2, wherein the first central contact surface and the second central contact surface are configured to couple to ean carry-an a first elongated member having a cross-sectional diameter of 1.25 inches or less, and wherein the first left contact surface, the first right contact surface, the second left contact surface, and the second right contact surface are configured to couple to a second elongated member having a cross-sectional diameter of 0.7 inches or less.

4. The swivel spacer of claim 3, wherein the first elongated member or the second elongated member is at least one of a cable, a cable bundle, and a duct.

5. The swivel spacer of claim 1, wherein a cylindrical cavity is formed in the first component, and a plurality of curved tabs are formed on the second component, wherein the plurality of curved tabs are inserted into the cylindrical cavity to rotatably couple the first component and the second component.

6. The swivel spacer of claim 5, wherein a stopper is formed on a distal end of each curved tab of the plurality of curved tabs, at least a portion of each stopper comprises an outer diameter that is larger than an inner diameter of the cylindrical cavity.

7. The swivel spacer of claim 6, wherein each stopper is a flange protruding outward at the distal end of each curved tab of the plurality of curved tabs.

8. The swivel spacer of claim 5, wherein the cylindrical cavity is positioned along a central axis of the first component and configured to extend through the first component along a vertical axis.

* * * * *